United States Patent
Matsuura et al.

[11] Patent Number: 5,247,233
[45] Date of Patent: Sep. 21, 1993

[54] DIGITIZING CONTROL DEVICE FOR GENERATING TRACING DATA

[75] Inventors: Hitoshi Matsuura, Hachioji; Eiji Matsumoto, Yamanashi, both of Japan

[73] Assignee: Fanuc Ltd, Minamitsuru, Japan

[21] Appl. No.: 860,519

[22] PCT Filed: Nov. 12, 1991

[86] PCT No.: PCT/JP91/01552
  § 371 Date: Jun. 18, 1992
  § 102(e) Date: Jun. 18, 1992

[87] PCT Pub. No.: WO92/09482
  PCT Pub. Date: Jun. 11, 1992

[30] Foreign Application Priority Data
Nov. 20, 1990 [JP] Japan .................. 2-314806

[51] Int. Cl.$^5$ .............................. G05B 19/33
[52] U.S. Cl. ........................ 318/570; 318/577; 318/640; 364/474.03; 364/474.05
[58] Field of Search ............... 318/570–574, 318/577, 640; 364/474.03, 474.08

[56] References Cited
U.S. PATENT DOCUMENTS

| | | | |
|---|---|---|---|
| 4,651,283 | 3/1987 | Sciaky et al. | 364/477 |
| 4,905,158 | 2/1990 | Seki et al. | 364/474.29 |
| 4,905,315 | 2/1990 | Solari et al. | 318/640 |
| 5,019,993 | 5/1991 | Montaleini et al. | 364/474.29 |
| 5,140,239 | 8/1992 | Matsuura | 318/577 |

FOREIGN PATENT DOCUMENTS

| | | |
|---|---|---|
| 0313801 | 5/1989 | European Pat. Off. |
| 0348247 | 12/1989 | European Pat. Off. |
| 01-114907 | 5/1989 | Japan |
| 01-153253 | 6/1989 | Japan |
| 03-60956 | 3/1991 | Japan |

*Primary Examiner*—William M. Shoop, Jr.
*Assistant Examiner*—Brian Sircus
*Attorney, Agent, or Firm*—Staas & Halsey

[57] ABSTRACT

A digitizing control device for generating tracing data related to a shape of a model while a tracer head carries out a non-contact tracing of the model shape. The rotation of the tracer head (4) is controlled in accordance with the inclination of a model surface (6), and distance detectors (5a, 5b) measure the distances therefrom to the model surface (6). When the inclination of the model surface (6) is smaller than a reference angle, the control of the rotation of the tracer head (4) is prohibited, to thereby achieve a stable distance measurement, and accordingly, accurate tracing data can be generated by a non-contact tracing of the model surface.

3 Claims, 4 Drawing Sheets

DIGITIZING CONTROL DEVICE FOR GENERATING TRACING DATA

TECHNICAL FIELD

1. Technical Field

This invention relates to a non-contact digitizing control device, and more particularly, to a digitizing control device for a non-contact tracing of a model surface to thereby generate tracing data related to a model shape.

2. Background Art

Tracing control devices using an optical distance detector for obtaining data related to a model shape by a non-contact tracing procedure have been developed for use in place of tracing devices having the function of tracing a model by placing a stylus in contact with the model, and at the same time, machining a workpiece to the same shape as the model. Further, if an NC device is given a tracing function, tracing data related to a model shape can be generated without directly combining the NC device with the tracing control device.

Generally, a device capable of tracing a model surface to obtain time-based tracing data, and automatically outputting the obtained data to an NC tape or the like, is called a digitizing control device.

Non-contact digitizing control devices can provide tracing data without the need for pressing a detector against a model surface, and accordingly, digitizing data can be calculated from information about the displacement of a tracer head when carrying out a non-contact tracing of the model surface, without damaging the model surface. The optical distance detectors conventionally employed for this purpose are a spot type wherein a spot light is irradiated onto a model surface and the distance from the model surface to a light-receiving face of the detector is detected.

In such spot type distance detectors, the tracer head must be controlled with reference to the model surface in such a manner that the light-receiving face of the detector is oriented in an optimum direction, because the accuracy of the detection of the distance from the model to the detector affects the digitizing data.

The distance detector is fixed to the tracer head, and usually follows the model surface at a location spaced therefrom by a reference distance. Accordingly, where the inclination of the model surface is small, an error in the distance detection poses no significant problem, but where the angle of inclination of the model surface is large, the angle between the tracer head and the normal line of the model surface also becomes large, and accordingly, the distance from the model surface becomes greatly deviated from the reference distance. As a result, the accuracy in detecting the distance from the model to the detector is lowered, an interference with the model surface occurs, and the tracing accuracy is adversely affected.

Accordingly, the inventors filed a patent application (Japanese Patent Application No. 1-194500) entitled "Non-contact Tracing Control Device" for an invention wherein the normal line of a model surface is derived from data related to the model shape and the rotation of the tracer head is controlled in accordance with variations in the direction of the normal line.

Nevertheless, where the model surface is nearly horizontal, the orientation of the tracer head, the rotary motion of which is controlled, becomes unstable due to an error in calculating the normal line or a measurement error.

DISCLOSURE OF THE INVENTION

This invention was created in view of the above circumstances, and an object thereof is to provide a digitizing control device capable of rotating and positioning a tracer head in a direction best following the inclination of a model surface, to thereby permit a stable non-contact tracing operation.

To achieve the above object, this invention provides a digitizing control device for generating tracing data related to a shape of a model while a tracer head carries out a non-contact tracing of the model shape, which comprises control means for controlling a control axis to thereby position the tracer head in a direction perpendicular to a surface on which the model is placed, and a rotary axis which controls a rotation of the tracer head around the control axis while the tracer head is inclined at a predetermined angle, distance measuring means for measuring a distance from the tracer head to a model surface, calculating means for calculating an inclination of the model surface from the tracing data related to the shape of the model, comparing means for comparing the inclination of the model surface with a reference angle, and prohibiting means for prohibiting the control of the rotation of the tracer head when the inclination of the model surface is smaller than the reference angle.

The rotation of the tracer head is controlled in accordance with the inclination of the model surface, to thereby prevent a lowering of the measuring accuracy of the distance measuring means, and when the inclination of the model surface is smaller than the reference angle, the control of the rotation of the tracer head is prohibited to thereby achieve a stable distance measurement.

Accordingly, accurate tracing data can be generated by a non-contact tracing of a model surface.

BEST MODE OF CARRYING OUT THE INVENTION

An embodiment of this invention will be described with reference to the drawings.

Figure 1:
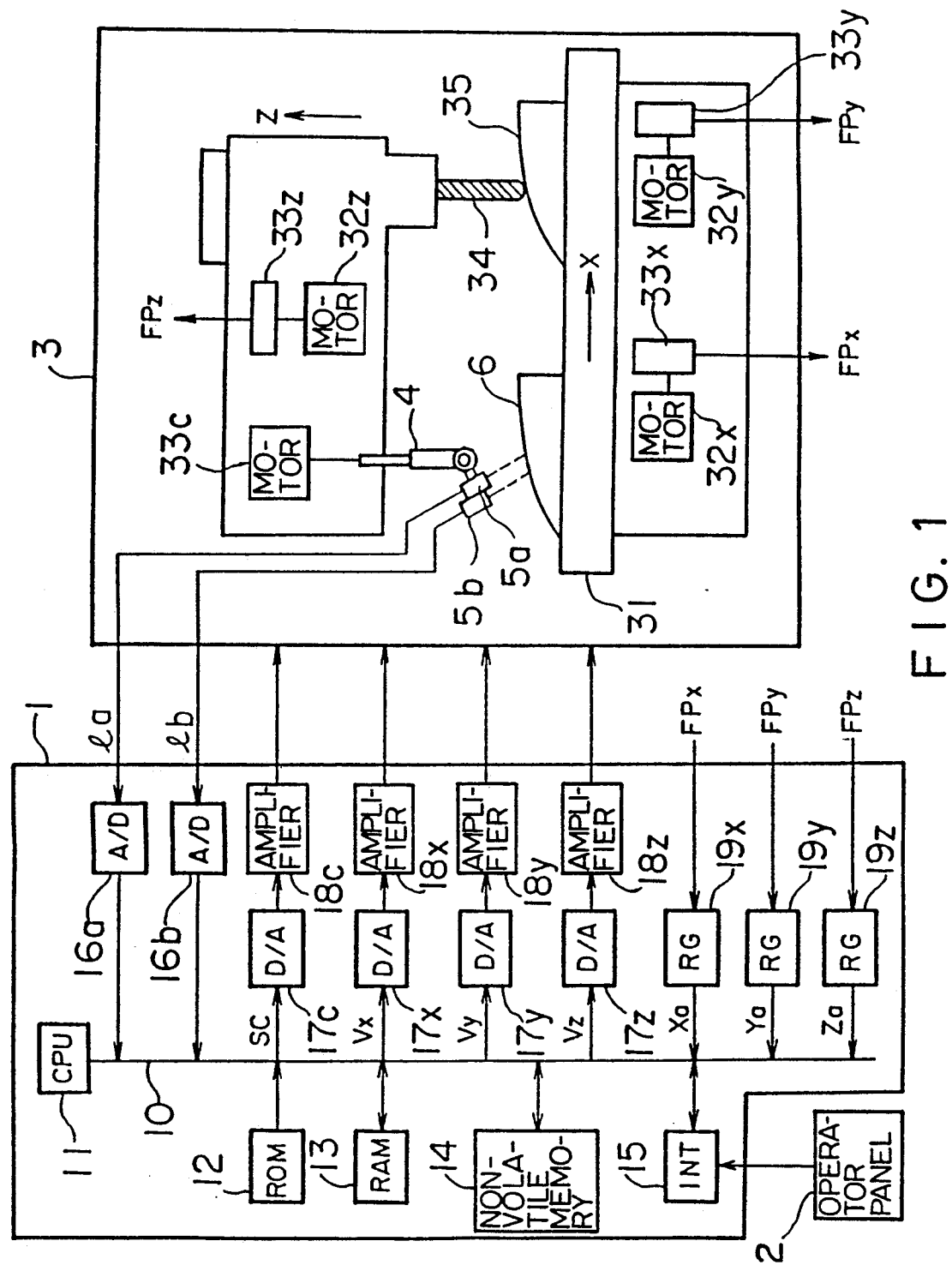
FIG. 1 is a block diagram showing the arrangement of a non-contact digitizing control device according to one embodiment of this invention.

FIG. 1 is a block diagram showing the arrangement of a non-contact digitizing control device and peripheral devices thereof.

As shown in the figure, in a digitizing control device 1, a processor 11 reads out a system program stored in a ROM 12 through a bus 10, and controls the entire operation of the digitizing control device 1 in accordance with the system program. A RAM 13, which is a temporary data storage device, stores measurement data from a light source and camera of a tracing machine tool, described later, and other temporary data. A non-volatile memory 14 is backed up by a battery, not shown, and stores various parameters, such as a tracing direction and a tracing speed, input through an operator panel 2.

Distance detectors 5a and 5b are mounted to a tracer head 4 of a tracing machine tool 3. A reflected-light amount type sensor using a semiconductor laser or light-emitting diode as the light source, for example, is used for the distance detectors 5a and 5b. Measured values la and lb representing the distances to the model surface are converted into digital values by A/D converters 16a and 16b in the digitizing control device 1, respectively, and are successively read by the processor 11.

The processor 11 computes the amounts of displacement of individual axes on the basis of the thus-converted digital values and signals from current position registers 19x, 19y and 19z, mentioned later, and generates speed commands Vx, Vy and Vz for the respective axes in accordance with the amounts of displacement, the tracing direction and the tracing speed, using techniques known in the art. The speed commands are converted into analog values by D/A converters 17x, 17y and 17z, and supplied to servo amplifiers 18x, 18y and 18z, respectively. The servo amplifiers 18x and 18y drive servomotors 32x and 32y of the tracing machine tool 3 in accordance with the input speed commands, respectively, whereby a table 31 is moved in an linear X-axis direction and a linear Y-axis direction perpendicular to the paper surface. The servo amplifier 18z drives a servomotor 32z, to thereby move the tracer head 4 and a tool 34 in a linear Z-axis direction.

Pulse coders 33x, 33y and 33z are mounted to the servomotors 32x, 32y and 32z, respectively, and generate detection pulses FPx, FPy and FPz each time a rotation of the corresponding servomotors exceeds a predetermined angle. The current position registers 19x, 19y and 19z in the digitizing control device 1 count up or down the detection pulses FPx, FPy and FPz, depending upon the direction of rotation, obtain current position data Xa, Ya and Za of the respective axes, and supply the derived data to the processor 11 as control data.

While controlling the individual axes, the processor 11 simultaneously samples the measured values la and lb from the distance detectors 5a and 5b at predetermined sampling intervals, and obtains a normal vector of the model surface by a method, described later, using the sampled data. A rotation command SC is generated in accordance with a projection of the normal vector onto the X-Y plane, and is converted into an analog value by a D/A converter 17c. A servo amplifier 18c drives a servomotor 33c in accordance with the rotation command SC, such that the tracer head 4 is rotated around the Z axis while being inclined at a predetermined angle. Simultaneously, the table 31 is moved in the commanded tracing direction at the commanded tracing speed, whereby a workpiece 35 is machined to the same shape as a model 6 by the tool 34, which is controlled through the linear Z axis, similar to the tracer head 4.

Where the model surface is nearly horizontal, however, the angle of the projected vector on the X-Y plane with respect to a reference axis becomes unstable in response to minute variations in the direction of the normal vector. Namely, the rotation command SC can be greatly varied due to an error in the calculation of the inclination of the model surface by the processor 11, or an error in the values la and lb measured by the distance detectors 5a and 5b. To eliminate the problem of an unstable orientation of the tracer head subjected to the rotation control, according to this invention, the processor 11 calculates the inclination of the model 6 and prohibits the rotation control of the tracer head 4 when the inclination is smaller than a set reference angle.

Figure 2:
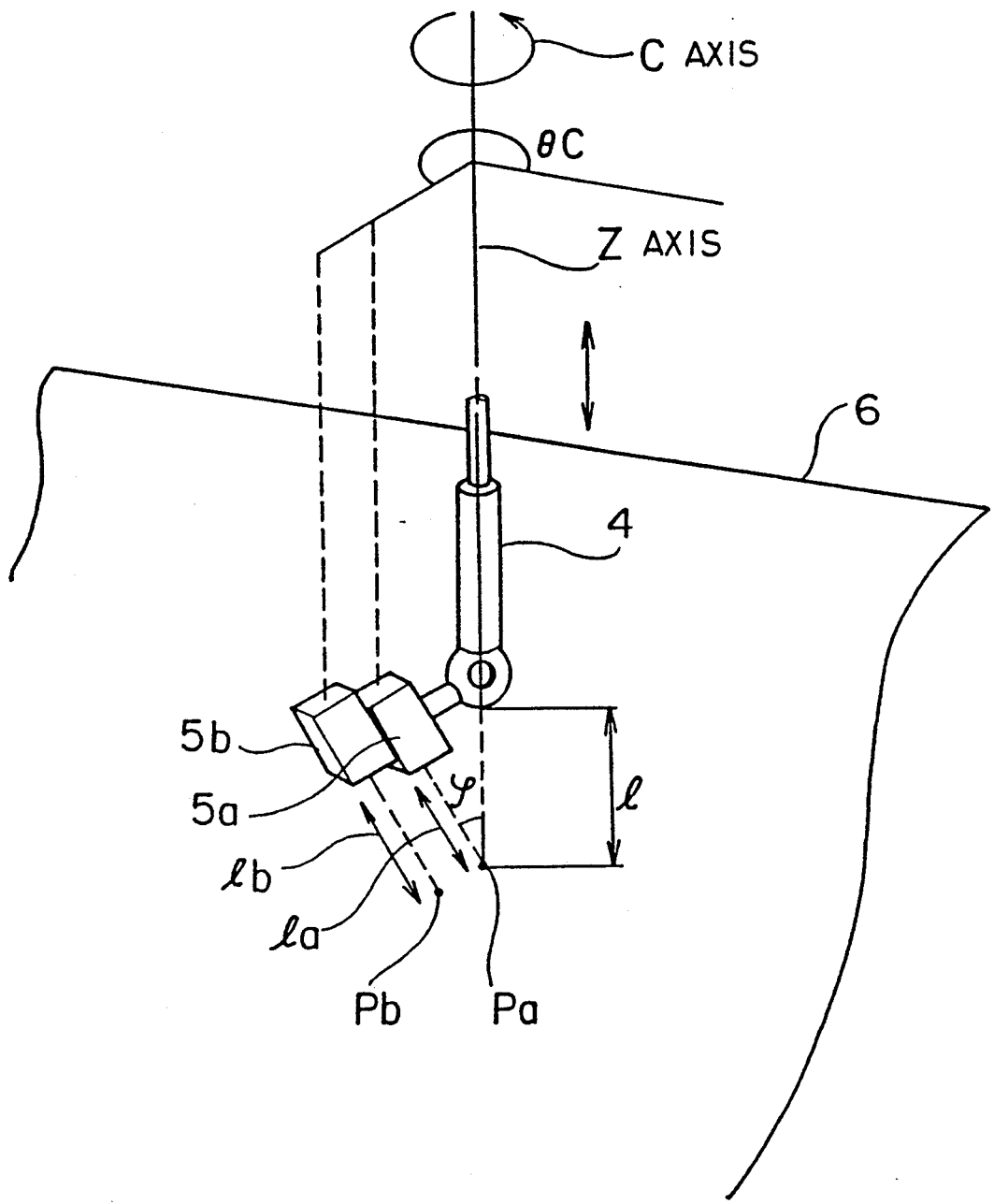
FIG. 2 is a view showing details of a tracer head according to the embodiment of this invention.

FIG. 2 shows details of the tracer head 4. As shown in the figure, the distance detector 5a is mounted to the tracer head 4 in such a manner that it is inclined at 45° to the linear Z axis, and is rotated by the rotational C axis along a circle having a predetermined radius over a command angle $\theta c$ specified by the rotation command SC. The distance detector 5b is attached adjacent to and is integral with the outer side of the distance detector 5a, and is similarly rotated by the commanded angle $\theta c$.

Accordingly, the distance detectors 5a and 5b can be rotated and positioned in a direction most suited to the inclination of the model 6, i.e., at a location closest to the normal line of the model surface.

The value measured by the distance detector 5a is fed back to the digitizing control device 1 as mentioned above, and therefore, a constant distance la from the distance detecter 5a to a measurement point Pa on the model 6 can be maintained. The distance la is set to be equal to the distance to the point of intersection of the measurement axis of the distance detector 5a with the linear Z axis, and thus the measurement point Pa is not shifted even when the tracer head 4 is rotated by the rotational C axis, whereby a constant distance l between the tracer head 4 and the model 6 also is maintained. Similarly, the distance detector 5b measures the distance lb to a measurement point pb on the model 6, and supplies the measured value to the tracing control device.

Figure 3:
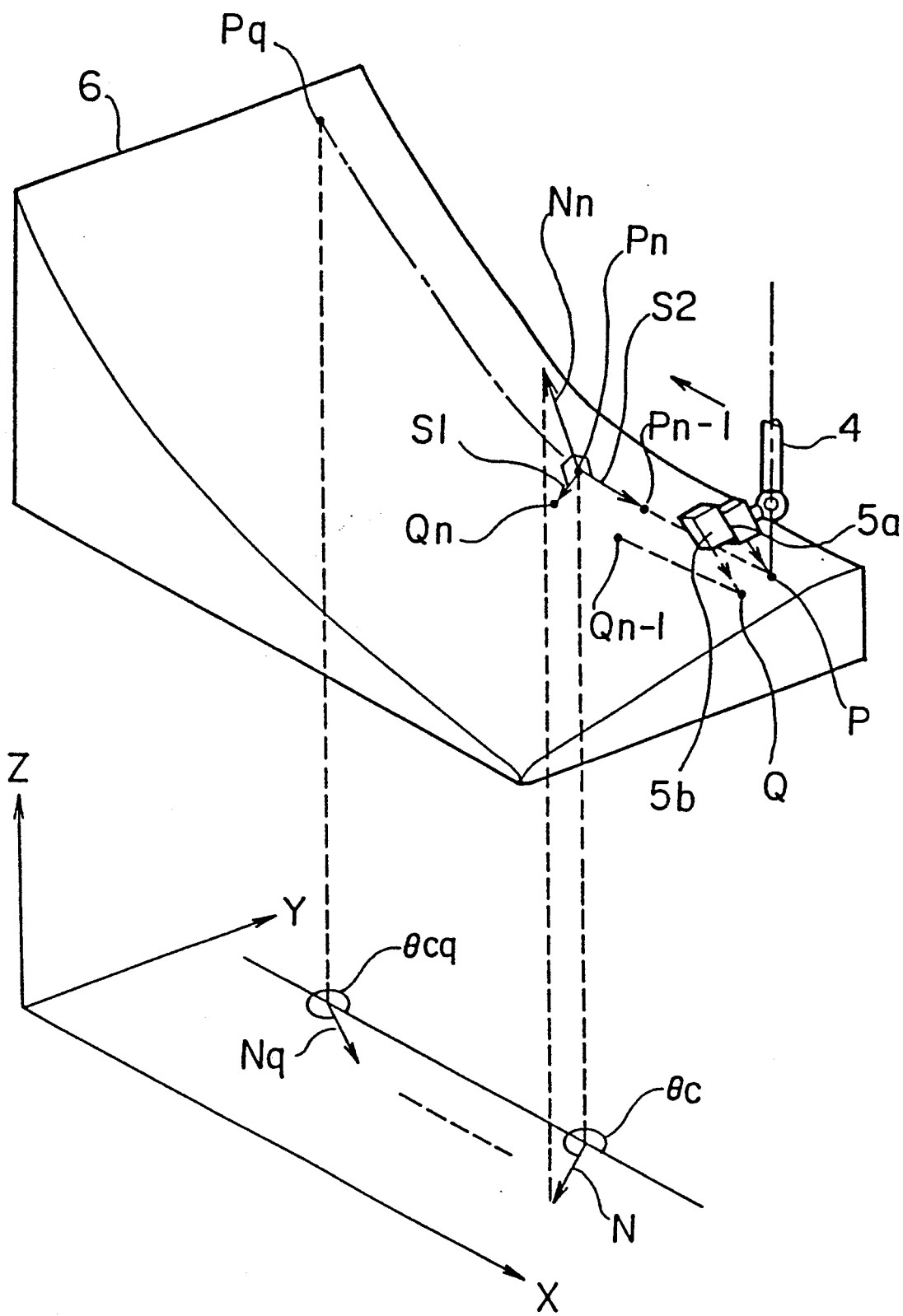
FIG. 3 is a diagram illustrating a rotation control of the tracer head.

A method of calculating the rotational angle of the tracer head 4 will be now described with reference to FIG. 3.

The tracer head 4 is moved for tracing in the linear X-axis direction at a predetermined tracing speed relative to the model 6, and at the same time, the measurement data related to two points pn and gn are sampled at predetermined intervals. Then, based on the thus-measured values and the current position data output from the current position registers, coordinates of points pn−1, Qn−1, Pn, Qn, Pn+1, Qn+1, . . . on the model 6 are obtained.

Then, a surface vector S1[X2-X1, Y2-Y1, Z2-Z1) is derived, e.g., from the coordinates (X1, Y1, Z1) of the point $P_n$ and the coordinates (X2, Y2, Z2) of the point gn, and further, a surface vector S2[X3-X1, Y3-Y1, Z3-Z1] is obtained from the coordinates (X3, Y3, Z3) of the point Pn-1 and the coordinates (X1, Y1, Z1) of the point Pn. In this case, the coordinate data of the point Pn-1 measured at a previous sampling time is stored in the RAM 13 or the like. The outer product of the two surface vectors S1 and S2 is calculated by the following equation:

$$Nn = S1 \times S2$$

(where Nn, S1, and S2 respectively denote vectors) whereby a normal vector Nn at the point pn is obtained.

Subsequently, the angle $\theta c$ between the linear X axis and a projection N of the normal vector Nn onto the X-Y plane is obtained by the following equation:

$$\theta c = \tan^{-1}(Jn/In)$$

where

In: linear X-axis component of the vector Nn

Jn:

Linear Y-axis component of the vector Nn and the derived angle $\theta c$ is output as a command value for the C axis.

The angle $\theta c$ varies in accordance with the inclination of the model 6, and becomes $\theta cq$, for example, at point Pq. The tracer head 4 is rotated in accordance with a variation such as that from the angle $\theta c$ to $\theta cq$.

Figure 4:
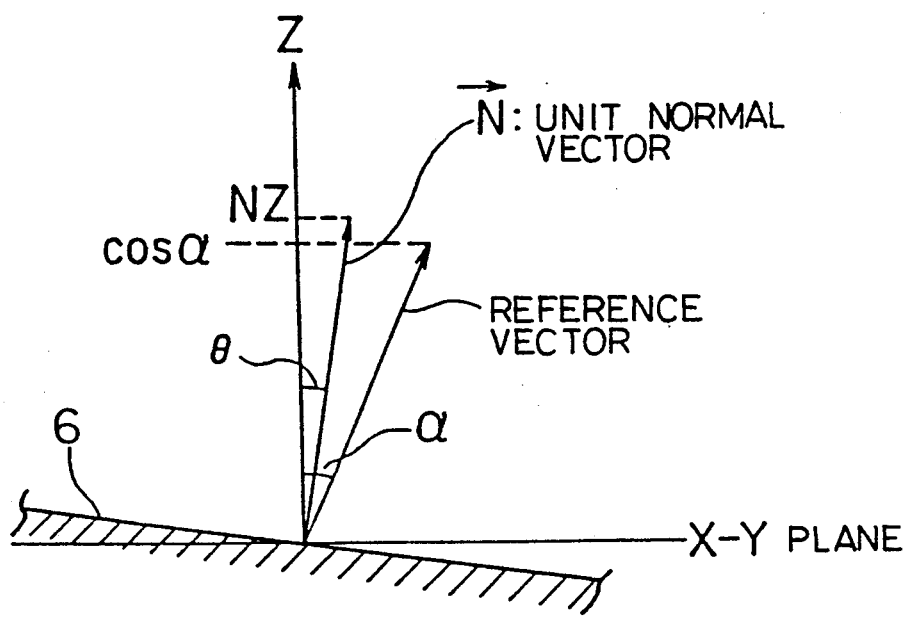
FIG. 4 is a diagram illustrating the relationship between the inclination of a model surface and a reference angle.

FIG. 4 illustrates a surface of the model 6 which is inclined at an angle smaller than the reference angle at the measurement point.

Here, the linear Z axis is an axis having an origin coinciding with the measurement point and perpendicular to the surface (X-Y plane) on which the model 6 is placed. A reference vector is a unit vector inclined at the reference angle $\alpha$ to the linear Z axis.

If it is assumed that the measured normal vector of the model surface is N (unit vector), and the individual components thereof are NX, NY and NZ, respectively, then when the angle $\theta$ between the vector N and the linear Z axis is smaller than the reference angle $\alpha$, it can be assumed that the model surface is approximately horizontal. Accordingly, it is possible to determine whether or not the model surface is inclined at an angle greater than or equal to the reference angle, by comparing $\cos\alpha$ of the reference angle $\alpha$ with $\cos\theta$ in a range of from 0° to 180°. Therefore, since $\cos\theta = NZ$, NZ is compared with $\cos\alpha$ of the reference angle $\alpha$, when $$NZ > \cos\alpha$$

the rotation command SC is not output to the D/A converter 17c, and thus the rotation control of the tracer head 4 is prohibited.

In the above embodiment, the normal vector is obtained from data measured at the preceding sampling time and data on the two detection points measured at the present sampling time, but if three points on the model surface measured at least at the preceding and present sampling times are specified, two surface vectors both having a start point at one of the three points can be determined.

Further, instead of the reflected-light amount type distance detector, an optical trigonometrical distance detector, eddy-current type distance detector, and ultrasonic distance detector and the like may be used.

Furthermore, although in the above embodiment the rotary axis of the tracer head is inclined at 45° with respect to the control axis, this angle of inclination may be freely set in accordance with the model shape.

This invention can, of course, be applied to a digitizing control device which does not have a tracing function for simultaneously machining a model but has only a function of automatically outputting data related to the model shape to an NC tape or the like.

As described above, according to this invention, the rotation of the tracer head is controlled in accordance with the inclination of the model surface, and when the inclination of the model surface is smaller than the reference angle, the rotation control of the tracer head is prohibited, whereby a stable distance measurement is achieved.

Accordingly, the measurement axis of the distance measuring means is oriented in a direction closest to the direction perpendicular to the model surface, to prevent a lowering of the measuring accuracy of the distance measuring means, and the control of the tracer head is stabilized even when a nearly horizontal model surface is traced, whereby a high-precision distance measurement is achieved and the tracing accuracy improved.

Therefore, the digitizing control device of this invention can efficiently obtain data at a high speed and a low cost.

We claim:

1. A digitizing control device for generating tracing data related to a shape of a model while a tracer head carries cut a non-contact tracing of the model shape, comprising:

control means for controlling a control axis to thereby position the tracer head in a direction perpendicular to a surface on which the model is placed, and a rotary axis which controls a rotation of the tracer head around the control axis while the tracer head is inclined at a predetermined angle;

distance measuring means for measuring a distance from the tracer head to a model surface;

calculating means for calculating an inclination of the model surface from the tracing data related to the shape of the model;

comparing means for comparing the inclination of the model surface with a reference angle; and prohibiting means for prohibiting the control of the rotation of the tracer head when the inclination of the model surface is smaller than the reference angle.

2. A digitizing control device according to claim 1, wherein the control means controls the rotation of the rotary axis of the tracer head while the rotary axis is inclined at an angle of 45° with respect to the control axis.

3. A digitizing control device according to claim 1, wherein the distance measuring means comprises an optical sensor for detecting light reflected from a measurement point on the model surface.

* * * * *

UNITED STATES PATENT AND TRADEMARK OFFICE
CERTIFICATE OF CORRECTION

PATENT NO. : 5,247,233
DATED : September 21, 1993
INVENTOR(S) : Hitoshi Matsuura et al.

It is certified that error appears in the above-identified patent and that said Letters Patent is hereby corrected as shown below:

Col. 1, line 49, "nc" should be --no--.

Col. 4, line 32, "pb" should be --Pb--;

line 41, "pn" should be --Pn--, and "gn" should be --Qn--;

line 45, "pn" should be --Pn--;

line 47, "S1[X2-X1, Y2-Y1, Z2-Z1)" should be --S1[X2-X1, Y2-Y1, Z2-Z1]--;

line 50, "gn" should be --Qn--; and line 62, "pn" should be --Pn--.

Col. 6, line 25, "cut" should be --out--.

Signed and Sealed this

Fifth Day of April, 1994

Attest:

BRUCE LEHMAN

*Attesting Officer*     *Commissioner of Patents and Trademarks*